(12) United States Patent
Takehara

(10) Patent No.: US 6,967,415 B2
(45) Date of Patent: Nov. 22, 2005

(54) POWER SOURCE APPARATUS

(75) Inventor: Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/683,291

(22) Filed: Oct. 14, 2003

(65) Prior Publication Data

US 2004/0080304 A1 Apr. 29, 2004

(30) Foreign Application Priority Data

Oct. 23, 2002 (JP) ........................................ 2002-308419

(51) Int. Cl.$^7$ ................................................ H02J 7/00
(52) U.S. Cl. ........................................................ 307/64
(58) Field of Search .............................. 307/64, 66, 80; 363/59, 60

(56) References Cited

U.S. PATENT DOCUMENTS

| | | | |
|---|---|---|---|
| 3,641,424 A | 2/1972 | Kuykendall | 323/286 |
| 3,654,518 A | 4/1972 | Phelps et al. | 361/101 |
| 4,481,434 A | 11/1984 | Janutka | 327/377 |
| 4,605,865 A | 8/1986 | Yuzurihara | 327/434 |
| 4,709,316 A | 11/1987 | Ngo et al. | 363/21.03 |
| 4,894,568 A | 1/1990 | Pavlin | 327/434 |
| 5,140,201 A | 8/1992 | Uenishi | 327/108 |
| 5,264,736 A | 11/1993 | Jacobson | 327/365 |
| 5,298,797 A | 3/1994 | Redl | 327/387 |
| 5,315,533 A * | 5/1994 | Stich et al. | 700/298 |
| 5,347,164 A * | 9/1994 | Yeh | 307/66 |
| 5,424,937 A | 6/1995 | Iyotani et al. | 363/136 |
| 5,455,757 A | 10/1995 | Nguyen et al. | 363/21.16 |
| 5,467,047 A | 11/1995 | Robb | 327/377 |
| 5,660,643 A | 8/1997 | Toggweiler | 136/244 |
| 5,737,208 A * | 4/1998 | Chen | 363/133 |
| 6,093,885 A | 7/2000 | Takehara et al. | 136/244 |
| 6,556,396 B1 | 4/2003 | Takehara et al. | 361/42 |
| 6,731,023 B2 * | 5/2004 | Rothleitner et al. | 307/64 |
| 2001/0040453 A1 | 11/2001 | Toyomura et al. | 324/332 |

FOREIGN PATENT DOCUMENTS

| | | |
|---|---|---|
| JP | 3-36332 | 5/1991 |
| JP | 3-036332 | 5/1991 |
| JP | 5-344708 | 12/1993 |

OTHER PUBLICATIONS

C. Ong, et al., "A Mathematical Model For Power Mosfet Capacitances," Proceedings of the Annual Power Electronics Specialists Conference, Conf. 22, Jun. 24, 1991, pp. 423–429.

* cited by examiner

Primary Examiner—Adolf Berhane
(74) Attorney, Agent, or Firm—Fitzpatrick, Cella, Harper and Scinto (57) ABSTRACT

A power source apparatus comprising: a direct current power source to output a first voltage; a load driven with a second voltage higher than the first voltage; a booster converter to boost an output from the direct current power source to the second voltage; and a control circuit, arranged to operate at a voltage higher than the first voltage, to control the booster converter. A power storage unit for storing an output from the booster converter is provided, and a reverse current blocking unit is provided between the power storage unit and the load, for preventing supply of electric power stored in the power storage unit to the load. When the booster converter is started, the electric power is supplied from the power storage unit to the control circuit, and when the booster converter has started, the electric power is supplied from the booster converter to the control circuit.

9 Claims, 8 Drawing Sheets

POWER SOURCE APPARATUS

FIELD OF THE INVENTION

The present invention relates to a power source apparatus, and more particularly, to control of a power source using a low-voltage direct current source as a main power source of a load, in which a voltage outputted from the direct current power source is boosted and supplied to the load.

BACKGROUND OF THE INVENTION

In recent years, the spotlight centers on the terrestrial environment and energy problems. In this situation, the transition to adoption of fuel battery with high energy density as a power source of portable devices has picked up momentum.

A general usage of the fuel battery is similar to that of well-known dry cells. Plural fuel batteries are serially connected, to produce a voltage necessary for a device, and the voltage is used as a power source. When the fuel is exhausted, a fuel cartridge tank is replaced with a new one, thereby power generation is started again.

This usage of serially-connected fuel batteries is very convenient, however, it has a problem that overvoltage occurs to each cell due to variation of performance of each battery cell and a problem that the stack (serial array) of the batteries itself does not function if the stack includes even one defective cell.

Figure 7:
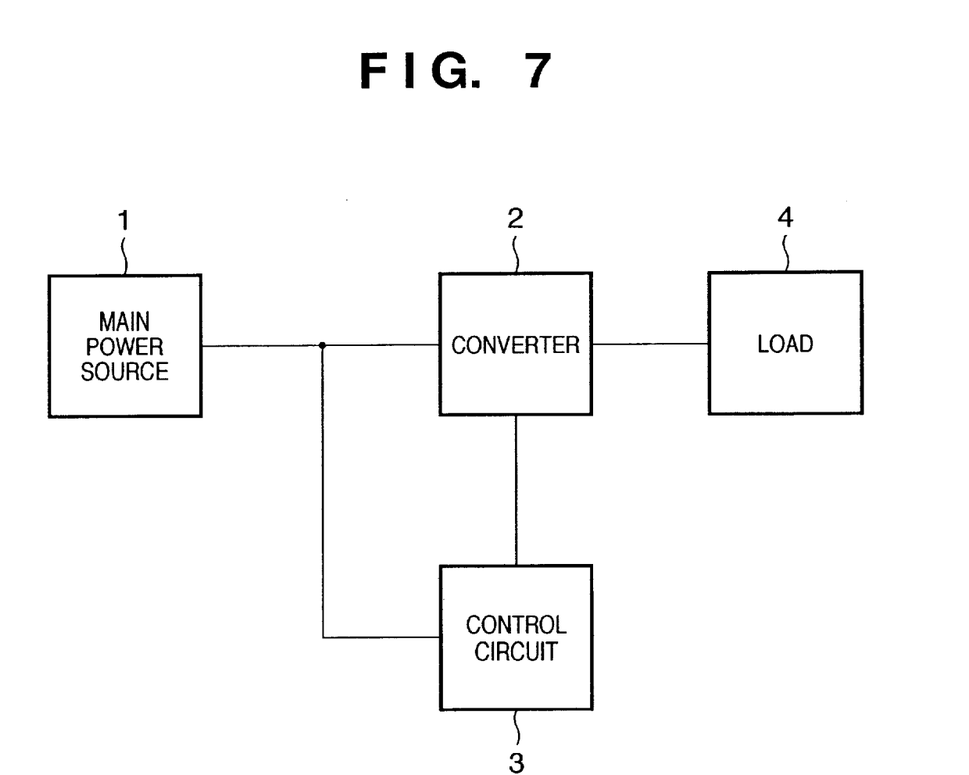
FIG. 7 is a block diagram showing the construction of the conventional power source apparatus.

FIG. 7 is a block diagram showing a construction to solve these problems. In the figure, reference numeral 1 denotes a main power source (battery cell); 2, a booster converter; 3, a control circuit; and 4, a load. In this construction, since one booster converter 2 is provided for one battery cell 1, and the power source of the control circuit 3 is obtained from the main power source 1, a voltage necessary for the load 4 can be obtained without serially connecting batteries.

However, generally, the voltage generated per 1 fuel battery cell is merely about 0.7 V, therefore it is difficult to construct a control circuit which operates at this low voltage.

Figure 8:
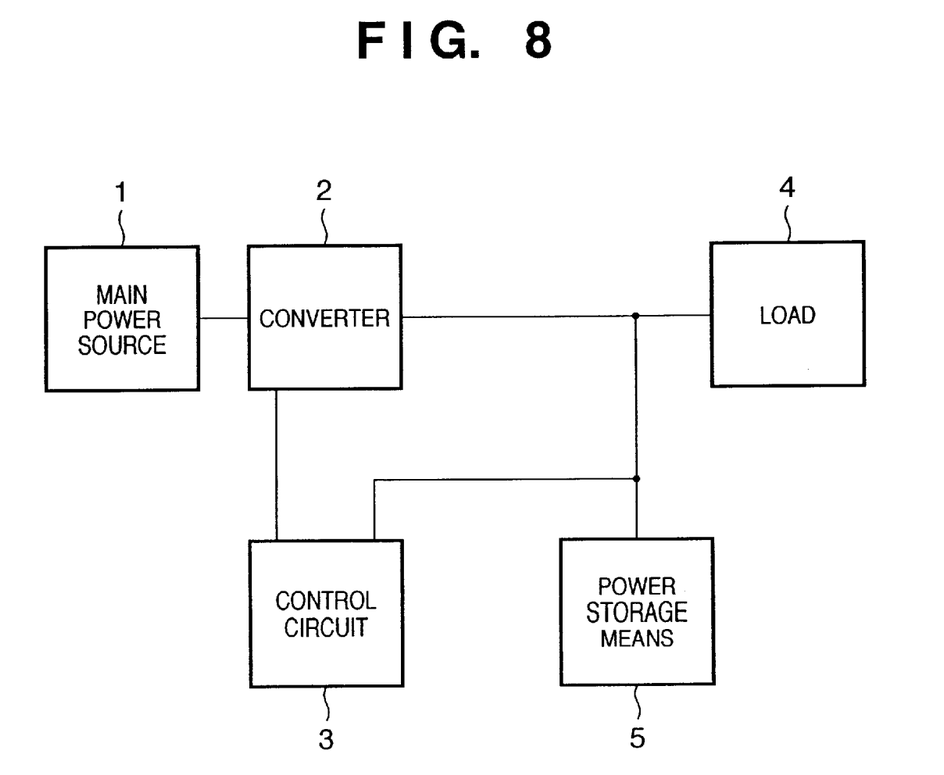
FIG. 8 is a block diagram showing the other construction of the conventional power source apparatus.

Further, as shown in FIG. 8 as an another example, the booster converter 2 may be provided with power storage means 5 on the secondary side, to obtain the power source of the control circuit 3 of the booster converter 2 from the power storage means 5.

However, in this method, as the load 4 is driven with the same power storage means 5, a large capacity battery or the like is required as the power storage means 5.

SUMMARY OF THE INVENTION

The present invention has its object to provide a power source apparatus using a low voltage direct current power source as a main power source of a load, in which a booster converter can be started in a stable manner and in which the capacity of power storage means can be reduced.

According to one aspect of the present invention, the foregoing object is attained by providing a power source apparatus comprising: a direct current power source to output a first voltage; a load driven with a second voltage higher than the first voltage; a booster converter to boost an output from the direct current power source to the second voltage; a control circuit, arranged to operate at a voltage higher than the first voltage, to control the booster converter; power storage means for storing an output from the booster converter; reverse current blocking means, provided between the power storage means and the load, for preventing supply of electric power stored in the power storage means to the load; and switch means for, when the booster converter is started, supplying the electric power from the power storage means to the control circuit, and when the booster converter has started, supplying the electric power from the booster converter to the control circuit.

According to the present invention, in the power source apparatus having the direct current power source to output a first voltage, the load driven with a second voltage higher than the first voltage, the booster converter to boost an output from the direct current power source to the second voltage, and the control circuit arranged to operate at a voltage higher than the first voltage, to control the booster converter, the power storage means is provided for storing an output from the booster converter, the reverse current blocking means is provided between the power storage means and the load for preventing supply of electric power stored in the power storage means to the load, and when the booster converter has started, the electric power is supplied from the power storage means to the control circuit.

In this arrangement, the control circuit starts to operate with the electric power stored in the power storage means and the booster converter is started, and thereafter, the control circuit operates with the output from the booster converter. Accordingly, the electric power stored in the power storage means is used only upon start of operation of the control circuit.

Accordingly, in the power source apparatus using a low-voltage direct current as a main power source of a load, the booster converter can be started in a stable manner, and the capacity of the power storage means can be reduced.

Further, in the power source apparatus, the switch means stops power supply to the control circuit when the voltage outputted from the direct current power source is lowered or when the load is not connected.

Further, in the power source apparatus, the direct current power source is one of a fuel battery, a solar cell and a chemical cell.

Further, in the power source apparatus, the direct current power source is constructed with a single cell which is not serially connected.

Further, in the power source apparatus, the switch means automatically supplies the electric power from the power storage means to the control circuit when connected to the direct current power source.

Further, in the power source apparatus, in the switch means, a user manually selects a first state to supply the electric power from the power storage means to the control circuit, and when the booster converter has started, a second state to supply the electric power from the booster converter to the control circuit.

Further, in the power source apparatus, in the switch means, a first state to supply the electric power from the power storage means to the control circuit, and when the booster converter has started, a second state to supply the electric power from the booster converter to the control circuit, are selected with a timer.

Further, in the power source apparatus, the reverse current blocking means is a diode.

According to another aspect of the present invention, the foregoing object is also attained by providing a control method for controlling a power source apparatus having: a direct current power source to output a first voltage; a load driven with a second voltage higher than the first voltage; a booster converter to boost an output from the direct current power source to the second voltage; a control circuit, arranged to operate at a voltage higher than the first voltage, to control the booster converter; and power storage means for storing an output from the booster converter, comprising the steps of: preventing supply of electric power stored in the power storage means to the load; and when the booster converter is started, supplying the electric power from the power storage means to the control circuit, and when the booster converter has started, supplying the electric power from the booster converter to the control circuit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
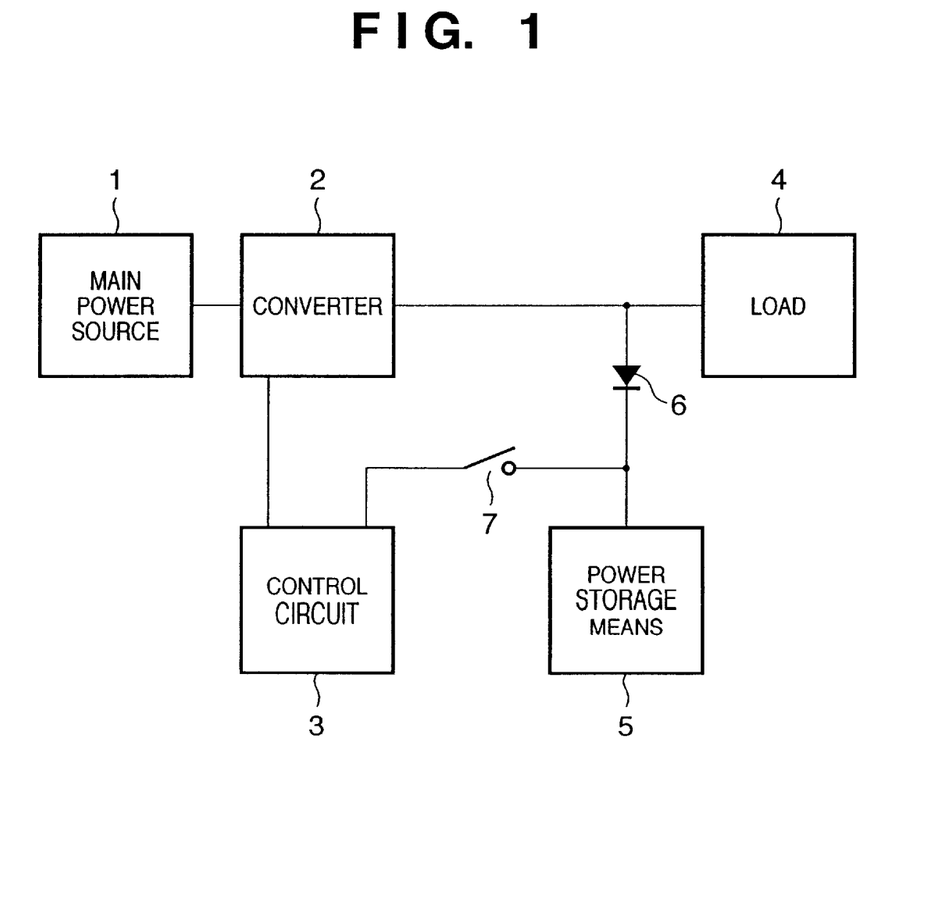
FIG. 1 is a block diagram showing the construction of a power source apparatus according to a first embodiment of the present invention.

FIG. 1 is a block diagram showing the construction of a power source apparatus according to a first embodiment of the present invention. As shown in FIG. 1, the power source apparatus of the present embodiment has a main power source 1, a booster converter 2, a control circuit 3, a load 4, power storage means 5, reverse current blocking means 6 and a starting switch 7. First, the respective constituent elements will be described.

[Main Power Source]

As the main power source 1, a well-known fuel battery, a solar cell or a chemical cell such as a manganese dry battery can be used, and there is no particular limitation on the battery type. A preferable battery to implement the present invention is a fuel cartridge or an exchangeable battery. From this viewpoint, a fuel battery, a dry cell or the like is appropriate. Further, an output voltage from the main power source must be lower than a voltage to drive the control circuit (often about 5 V) to be described later. The output voltage of the above battery is generally 0.6 to 1.5 V in use of single cell which is not serially connected outside, such single cell battery is appropriate to the present invention.

[Booster Converter]

As the booster converter 2, various well-known circuits such as a forward converter using a switching device, a push-pull converter and a chopper converter can be used. As long as a converter driving signal is given by the control circuit, there is no particular limitation on the circuit type.

[Control Circuit]

As in the case of the booster converter 2, an appropriate circuit can be used as the control circuit 3. The operation voltage of the control circuit is important, and it must be higher than the output voltage from the main power source. In many control circuits, a power source voltage of about 3 to 15 V is required. As long as the output voltage from the main power source is low, there is no problem upon implementation of the present invention.

[Load]

Although there is no limitation on the load 4, the electric power to be consumed must be supplied from a single power source.

[Power Storage Means]

As the power storage means 5, a small-capacity and long-life (cycle) battery is desirable. A large-capacity capacitor such as a large-capacity aluminum electrolytic capacitor or an electric double-layer capacitor, a button-type nickel-cadmium battery, or the like, can be used. Since the battery is charged with an output from the secondary side of the booster converter, the output voltage of the converter must be selected within an available voltage range. Further, it is known that a part of primary batteries such as a sliver oxide cell can withstand charging with a very low current. Such battery can be used as long as it is carefully handled.

[Reverse Current Blocking Means]

The reverse current blocking means 6, for prevention of consumption of electric power stored in the power storage means 5 by the load 4, preferably is a diode device. Especially, a Schottky barrier diode in which the amount of voltage drop in a forward direction is small is low-loss diode and is advantageous.

[Starting Switch]

The starting switch 7 forms a power source supply path from the power storage means 5 to the control circuit 3. As this switch, an appropriate switch can be used from a very large number of well-known switch means such as an electronic switch using a semiconductor device and a push-button switch.

(Particular Construction)

Hereinbelow, a particular construction of the present embodiment will be described.

As the main power source 1, a fuel battery cell using a hydrogen cartridge with an output voltage of 0.7 to 0.8 V is used. Since this fuel battery, well known as disclosed in, e.g., Japanese Published Unexamined Patent Application No. 2002-158021, is not the characteristic feature of the present invention, the details of the battery will be omitted.

As the booster converter 2, a well-known booster chopper circuit with an output voltage of 5 V, using a MOSFET as switching means, is used, and as the control circuit 3 for the booster converter 2, a commercial switching power source controller IC for power source voltage of 5 V is used.

As the power storage means 5, an electric double-layer capacitor with a voltage of 5 V and having a capacity of 0.1 F is used. Further, as the reverse current blocking means 6, a Schottky barrier diode is used. These elements are commercially available.

Note that the power storage means 5 must be initially charged by any means. If the power storage means 5 is not charged, regardless of operation of the starting switch 7, the power source cannot be supplied to the control circuit 3 and the starting cannot be made. From this viewpoint, in use of a secondary battery, a discharge voltage is flat and the voltage can be maintained even if it is somewhat charged, accordingly, a secondary battery is far superior to a capacitor.

Figure 5:
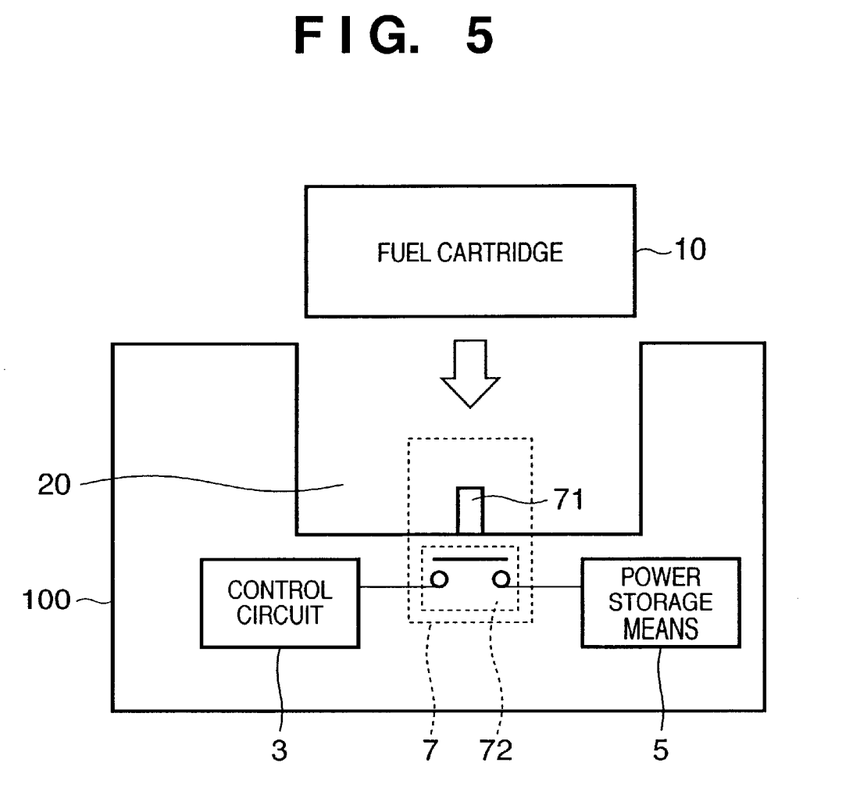
FIG. 5 is a block diagram showing a particular construction of a starting switch according to the first embodiment.

The starting switch 7 is automatically turned ON in accordance with replacement of the hydrogen cartridge of the main power source 1. FIG. 5 shows a particular construction of the starting switch 7 of the present embodiment. The starting switch 7 of push-button type is provided on an inner surface of a fuel cartridge container 20 provided in a main body of a portable electric device 100. When a fuel cartridge 10 is set, a push-button 71 is automatically depressed, and an electric contact 72 is closed, thereby power supply is performed from the power storage means 5 to the control circuit 3. When the cartridge 10 is removed, the starting switch 7 becomes open. In this arrangement, as a user's manual operation is not necessary, the convenience can be improved.

[Operation]

Figure 3:
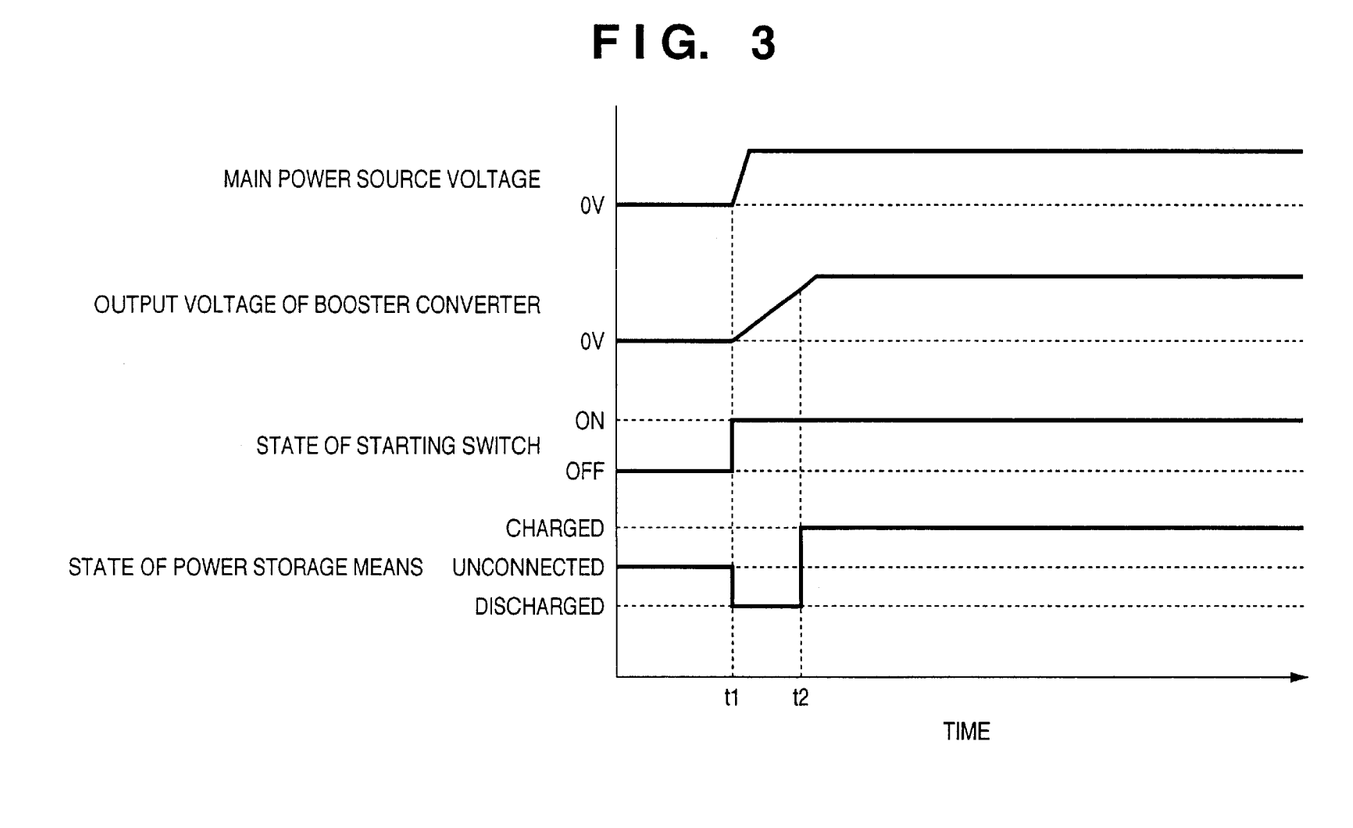
FIG. 3 is a timing chart of the operation of the power source apparatus in FIG. 1.

Next, the operation of the first embodiment will be described. FIG. 3 is a timing chart of the operation of the first embodiment upon starting.

In FIG. 3, in an initial state prior to time t1, the (cartridge) of the main power source 1 is not attached, the state of the starting switch 7 is OFF, the booster converter 2 does not operate, and the secondary side voltage is not outputted. At this time, as the power storage means 5 is not connected to the load by the operation of the reverse current blocking means 6 and the starting switch 7 is OFF, it is in a "unconnected" state in which it not connected to the control circuit 3.

Next, at time t1, when the main power source 1 is attached by replacement of battery or the like, a voltage is supplied, and at approximately the same time, the starting switch 7 is turned ON. The ON operation of the starting switch 7 is not necessarily made in strict synchronization with the power supply from the main power source, but the ON operation is preferably made, from the view point of reduction of capacity of the power storage means 5, immediately after the establishment of the main power source. Further, in the present embodiment, when the starting switch is turned ON, discharging from the power storage means 5 is started regardless of the state of the main power source 1 (existence/absence of voltage). In a system where the starting switch 7 is ON even when the main power source is not established, the electric current continuously flows from the power storage means 5 to the control circuit 3, and in accordance with circumstance, the power storage means 5 comes into an over discharging state.

In the present embodiment, to avoid the above inconvenience, it is preferable that, e.g., when the voltage outputted from the main power source is lowered or when the load is not connected, the power supply to the control circuit is stopped.

From the time t1, the output voltage of the booster converter gradually increases (the speed of the increase depends on the circuit mode or the capability of the main power source), and when the voltage exceeds a voltage necessary for charging the power storage means (time t2), a charged state is maintained in the power storage means. In this manner, in the present embodiment, as the discharging period of the power storage means 5, from the time t1 to the time t2, is short, and the load driven by the power storage means has a small power capacity for only the control circuit 3, the capacity of the power storage means is extremely small. Further, as the power storage means 5 is used as a specialized starting means, the starting can be made without influence of the operation states of the load and the main power source, and the starting operation can be performed in a stable manner in comparison with the conventional method.

In the present embodiment, when the voltage generated by the main power source is lowered, a smooth and stable starting operation can be expected by replacement of fuel cartridge. Regarding the load, the details will be omitted in this embodiment, but it is considered that the present invention is applicable to a tool where a cartridge is comparatively frequently replaced such as a cellular phone or a personal computer.

Further, in the present embodiment, the part to be replaced is the "fuel cartridge", however, it is apparent that even in a case where the main power source is a primary battery such as an alkaline dry cell, if the primary battery itself is used as a "replacement part", the operation intended by the present invention can be implemented.

Note that in the present embodiment, as the power source is supplied from the power storage means to the control circuit until the cartridge 10 is removed, attention must be paid to the over discharging of the power storage means. To avoid the over discharging, an operational counter measure may be made such that the fuel cartridge is pulled out when the apparatus is not used, or circuit means for linkage of the state of the load to power supply to the control circuit may be provided.

<Second Embodiment>

Hereinbelow, the power source apparatus according to a second embodiment of the present invention will be described. Note that in the following description, similar elements to those of the above first embodiment have the same reference numerals and the explanations thereof will be omitted.

Figure 2:
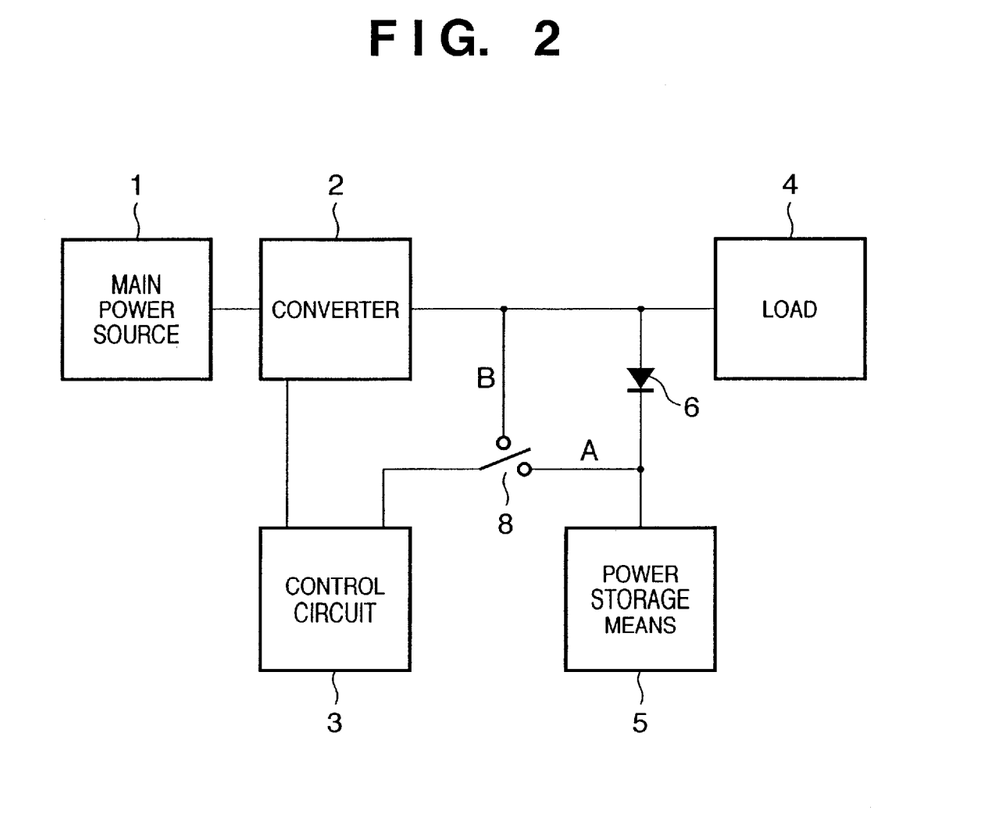
FIG. 2 is a block diagram showing the construction of the power source apparatus according to a second embodiment of the present invention.

FIG. 2 is a block diagram showing the construction of the power source apparatus according to the present embodiment. In comparison with the first embodiment as shown in FIG. 1, a starting switch 8 is provided in place of the starting switch 7. The starting switch 8 is a commercial switch which performs a so-called "momentary operation", i.e., it is "connected to the A side only while it is depressed, but connected to the B side at normal times".

More particularly, the starting switch 8 connects the power source supplied to the control circuit 3, to one of the power storage means 5 (A side) and the output of the booster converter 2 (B side). That is, the starting switch 8 is not a simple ON/OFF switch as that of the first embodiment, but is a connection selective type switch.

Accordingly, the feature of the present embodiment is that the state of the voltage outputted from the main power source 1 is reflected in the power supply to the control circuit 3. Note that the position where the starting switch 8 is provided is on the surface of the tool using the power source apparatus of the present embodiment such that the switch can be manually operated.

The particular operation of the starting switch 8 is as follows.

When the fuel cartridge has been replaced with new one, the generation of predetermined voltage from the fuel battery is waited.

Thereafter, the button of the starting switch 8 is depressed for a predetermined period. At this time, the power storage means is charged by the operation of the apparatus before the replacement.

The start of the booster converter is checked, then the starting switch 8 is released.

Note that it is not necessary but is preferable to provide display means for checking the start of the booster converter. Further, even if the main power source is not a fuel battery but a chemical cell such as an alkaline-manganese dioxide cell, the same operation can be made.

Figure 4:
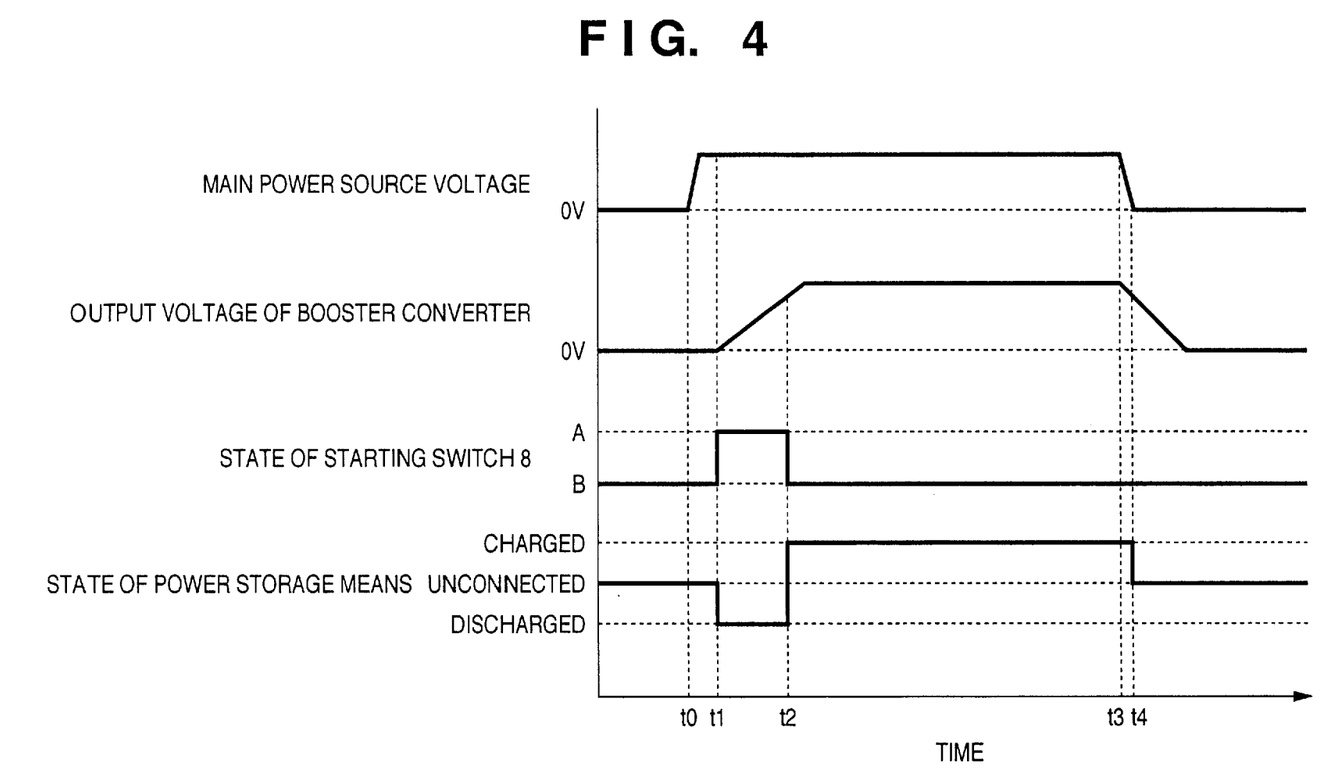
FIG. 4 a timing chart of the operation of the power source apparatus in FIG. 2.

Next, the operation of the present embodiment will be described with reference to the timing chart of FIG. 4 showing the state of starting.

In FIG. 4, in an initial state prior to time t1, the (cartridge) of the main power source 1 is not attached, the starting switch 8 is connected to the B side, the booster converter 2 does not operate, and the secondary side voltage is not outputted. At this time, as the power storage means 5 is not connected to the load by the operation of the reverse current blocking means 6 and the starting switch 8 is connected to the B side, it is in a "unconnected" state in which it not connected to the control circuit 3.

At time t0, the cartridge is attached to the main power source 1, then at time t1, the starting switch 8 is connected to the A side, and the control circuit 3 is driven with the electric power supplied from the power storage means 5.

Thereafter, at time t2 where the output voltage of the booster converter 2 exceeds a predetermined value, the switch 8 is connected to the B side, and the control circuit 3 is driven directly with the output from the booster converter 2. The power storage means 5 comes into a charged state through the reverse current blocking means 6.

At time t3, the output voltage from the main power source 1 is lowered, then the output voltage from the booster converter 2 is lowered, and the output voltage of the power storage means 5 exceeds the output voltage of the converter. At this time, as the electric current does not flow through the reverse current blocking means 6, the power storage means 5 comes into the unconnected state at time t4, and finally, the operation of the control circuit 3 stops, and the entire power source apparatus stops.

In the present embodiment, as described above, when the electric power outputted from the main power source is lowered, the power storage means 5 is reliably separated from the control circuit 3 by the operation of the selection type starting switch 8. As a result, the over discharging from the power storage means 5 can be reliably prevented.

<Third Embodiment>

Hereinbelow, the power source apparatus according to a third embodiment of the present invention will be described. Note that in the following description, similar elements to those of the above first and second embodiments have the same reference numerals and the explanations thereof will be omitted.

Figure 6:
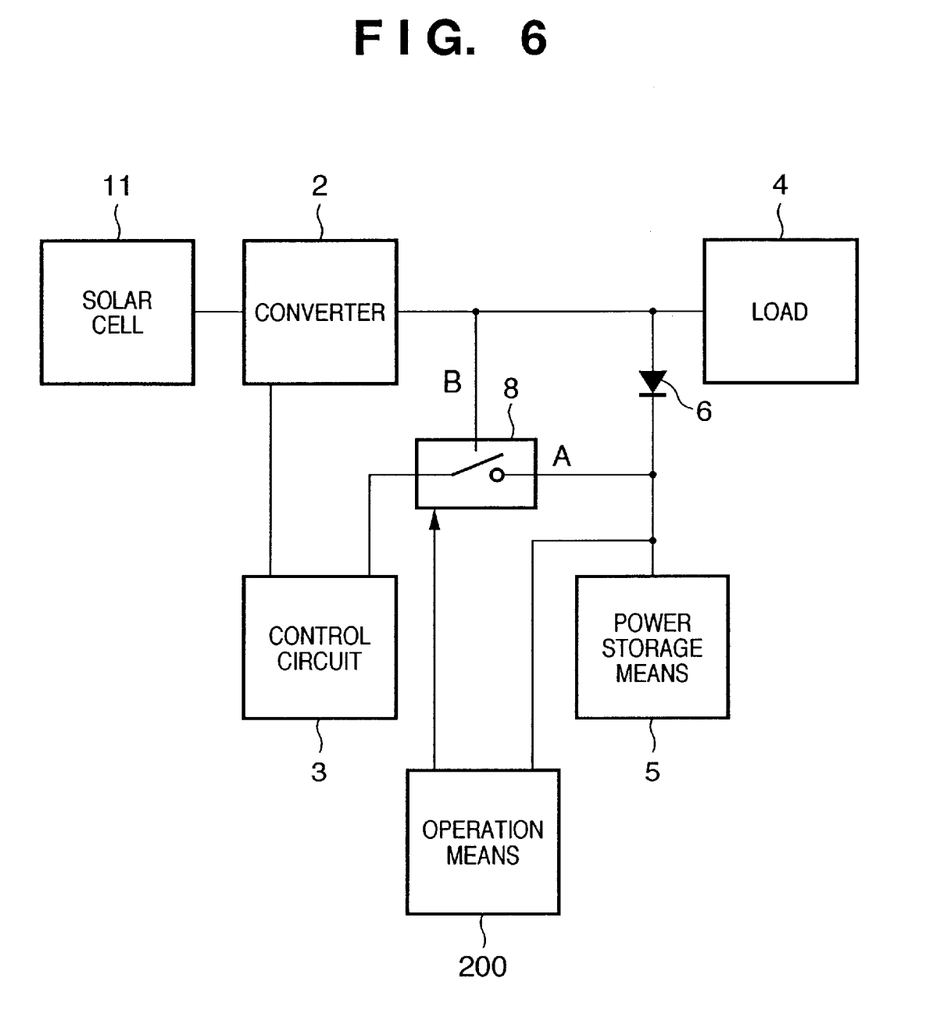
FIG. 6 is a block diagram showing the construction of the power source apparatus according to a third embodiment of the present invention.

In the present embodiment, a solar cell is used as the main power source. FIG. 6 is a block diagram showing the construction of the power source apparatus according to the present embodiment. The basic circuit construction is the same as that of the second embodiment as shown in FIG. 2.

In the present embodiment, as the main power source, a monocrystal solar battery cell 11 (output: 0.5 V, 4 A) is used. The booster converter 2 and the control circuit 3 have the same constructions as those of the second embodiment. As the load 4, a radio receiver is used.

In the present embodiment, the starting switch 8 is constructed with a so-called "latching relay". The latching relay having a set coil and a reset coil can change a connection state by application of pulse voltage. In the latching relay, no electric consumption occurs at times other than an operation time. In addition, a semiconductor relay using a MOSFET having a similar function is commercially available, and such relay can be used as the starting switch 8.

In the present embodiment, as operation means 200 for operation of the switch, a timer device having a very-low electric consumption type CMOS-IC driven with the power storage means 5 is used. As the timer device with very-low electric consumption in comparison with the control circuit 3 is used as the operation means 200, the operation means almost does not influence the necessary capacity of the power storage means 5.

In the case where the solar cell is used as the main power source, the time where a predetermined or larger amount of electric power is generated changes at each season. Accordingly, in the present embodiment, the starting time of the power source apparatus is changed by changing the time set in the timer device. As an example of setup of the timer, if it is fine, the timer is set such that the contact is connected to the A side only for 5 seconds from 9:00 AM at which it is considered that a predetermined or larger amount of electric power is generated from the solar cell.

Note that the timing chart of the operation of the present embodiment is similar to the timing chart of FIG. 4 described in the second embodiment, and in the above example, the period between the times t1 and t2 is 5 seconds. Further, as the operation means for the switch 8, various changes may be made by, e.g., using a radio signal.

As described above, the power source apparatus of the present invention is also applicable to a case where a solar cell is used as a main power source.

Further, the present invention can be applied to a system constituted by a plurality of devices or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. A power source apparatus comprising:
   a direct current power source to output a first voltage;
   a load driven with a second voltage higher than the first voltage;
   a booster converter to boost an output from the direct current power source to the second voltage;
   a control circuit, arranged to operate at a voltage higher than the first voltage, to control the booster converter;
   power storage means for storing an output from the booster converter;
   reverse current blocking means, provided between the power storage means and the load, for preventing supply of electric power stored in the power storage means to the load; and
   switch means for, when operation of the booster converter is being started, supplying the electric power from the power storage means to the control circuit, and when operation of the booster converter has been started, supplying the electric power from the booster converter to the control circuit.

2. The power source apparatus according to claim 1, wherein the switch means stops power supply to the control circuit when the voltage outputted from direct current power source is lowered or when the load is not connected.

3. The power source apparatus according to claim 1, wherein the direct current power source is one of a fuel battery, a solar cell and a chemical cell.

4. The power source apparatus according to claim 1, wherein the direct current power source is constructed with a single cell which is not serially connected.

5. The power source apparatus according to claim 1, wherein the switch means automatically supplies the electric power from the power storage means to the control circuit when connected to the direct current power source.

6. The power source apparatus according to claim 1, wherein in the switch means, a user manually selects a first state to supply the electric power from the power storage means to the control circuit, and when operation of the booster converter has been started, a second state to supply the electric power from the booster converter to the control circuit.

7. The power source apparatus according to claim 1, wherein in the switch means, a first state to supply the electric power from the power storage means to the control circuit, and when operation of the booster converter has been started, a second state to supply the electric power from the booster converter to the control circuit, are selected with a timer.

8. The power source apparatus according to claim 1, wherein the reverse current blocking means is a diode.

9. A control method for controlling a power source apparatus having: a direct current power source to output a first voltage; a load driven with a second voltage higher than the first voltage; a booster converter to boost an output from the direct current power source to the second voltage; control current, arranged to operate at a voltage higher than the first voltage, to control the booster converter; and power storage means for storing an output from the booster converter, comprising the steps of:

preventing supply of electric power stored in the power storage means to the load; and when operation of the booster converter is being started, supplying the electric power from the power storage means to the control circuit, and when operation of the booster converter has been started, supplying the electric power from the booster converter to the control circuit.

* * * * *